United States Patent
Nishiyama et al.

(10) Patent No.: US 8,068,687 B2
(45) Date of Patent: Nov. 29, 2011

(54) OBJECT RECOGNIZING APPARATUS AND METHOD

(75) Inventors: Masashi Nishiyama, Kawasaki (JP);
Hidenori Takeshima, Ebina (JP);
Tatsuo Kozakaya, Kawasaki (JP);
Osamu Yamaguchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 595 days.

(21) Appl. No.: 12/262,735

(22) Filed: Oct. 31, 2008

(65) Prior Publication Data

US 2009/0110303 A1 Apr. 30, 2009

(30) Foreign Application Priority Data

Oct. 31, 2007 (JP) .................................. 2007-282932

(51) Int. Cl.
*G06K 9/40* (2006.01)
*H04N 5/225* (2006.01)

(52) U.S. Cl. ........................................ 382/255; 348/169

(58) Field of Classification Search .................. 382/103, 382/107, 118, 159, 165, 190, 224, 225, 255, 382/287, 307, 391; 348/94, 152, 154, 155, 348/169, 170, 208.1, 208.2, 208.14, 208.16, 348/352

See application file for complete search history.

(56) References Cited

U.S. PATENT DOCUMENTS 6,301,370 B1 * 10/2001 Steffens et al. ............... 382/103
7,346,222 B2 * 3/2008 Lee et al. ...................... 382/260

FOREIGN PATENT DOCUMENTS

JP 2005-332382 12/2005

OTHER PUBLICATIONS

Farsiu et al, Fast and Robust Multiframe Super Resolution, IEEE Transactions on Image Processing, vol. 13, No. 10, Oct. 2004.

* cited by examiner

*Primary Examiner* — Abolfazl Tabatabai
(74) *Attorney, Agent, or Firm* — Turocy & Watson, LLP

(57) ABSTRACT

An object is identified by detecting an object area image of an object to be recognized from a degraded image, converting the object area image to a frequency area, extracting a feature vector which indicates the amount of blur, comparing the feature vector and a classified plurality of blurred images, obtaining a cluster which is the most similar to the feature vector, selecting one point spread function corresponding to the similar cluster, restoring the object area image to the image before being blurred using the point spread function, and comparing the restored image and a target image.

8 Claims, 3 Drawing Sheets

301

302

303

304

LEANING

RECOGNITION

OBJECT RECOGNIZING APPARATUS AND METHOD

CROSS-REFERENCE TO RELATED APPLICATION

This application is based upon and claims the benefit of priority from the prior Japanese Patent Application No. 2007-282932, filed on Oct. 31, 2007; the entire contents of which are incorporated herein by reference.

FIELD OF THE INVENTION

The present invention relates to an object recognizing apparatus and an object recognizing method for object recognition such as face recognition.

DESCRIPTION OF THE BACKGROUND

A technology of identifying individuals by face recognition is one of the important fields of study in biometrics. A principal problem which decreases the performance of individual identification is variations in facial appearance in an image. A main cause of the variations in appearance includes illumination, the posture, and degradation of the image. The degradation of the image includes low resolutions, blur, and noises. The blur causes two problems in the face recognition.

A first problem is a case in which a person is not identified correctly although he/she is an original person. The reason is that the facial image is not similar to the original person due to the variation of the image. In other words, it is a case in which FRR (False Rejection Rate) is increased.

A second problem is a case in which a person is identified erroneously as a different person. The reason is that the states of the facial images are similar among different persons. In other words, it is a case in which FAR (False Acceptance Rate) is increased.

In order to solve these problems, two methods shown below are proposed. In a first method, variation of the image is learned by blurring the image artificially. In a second method, the blur is removed by restoring the image for identification.

The first method is performed as follows. First of all, a target image is assumed not to be blurred. Then the target image is artificially blurred to increase target data. Accordingly, the FRR is restrained. However, there still remains the problem of high FAR because the target data is similar to other persons. Furthermore, there arises a problem of increase in storage capacity of the target data.

The second method is performed as follows. The image is restored to a state before being blurred by a method of restoring the image such as blind deconvolution and a super-resolution. The restored image is used for identifying the individual. The second method is applicable to a case in which the target image is blurred and hence is effective for identifying the individual. In the image restoration, the process of degradation due to the blur is represented by a point spread function. In order to obtain a performance of individual identification, it is important to estimate the point spread function from the degraded image with high degree of accuracy.

A method of using an edge width of a contour of an object is proposed in JP-A-2005-332382 (KOKAI) for estimating the point spread function. This method uses a phenomenon such that an edge of the image in focus is sharp and has a narrow width, and an edge of the blurred image is smooth and has a wide width. In JP-A-2005-33238 (KOKAI), a face area or pupil is detected from the blurred image, and then the contour thereof is detected. The edge width is obtained from the cross-section of the edge on the contour and is compared with a histogram of the edge width which is learned from the blurred image in advance.

However, in the method shown above, when the image is blurred, the contour is not clear, and hence the contour is difficult to detect in comparison with the detection of the face area or the pupil. When the result of detection of the contour includes error, the shape of the cross-section of the edge is significantly different.

Therefore, there is a problem such that the edge width obtained from the cross-section of the edge is not a stable feature for estimating the point spread function. In the case where the image includes noises, there also arises a problem that the edge width is an unstable feature.

SUMMARY OF THE INVENTION

Accordingly it is an object of the invention to provide an object recognizing apparatus and an object recognizing method which enables estimation of a stable point spread function for object recognition.

According to embodiments of the present invention, there is provided an object recognizing apparatus including: an area acquiring unit configured to detect object area images of an object to be recognized from a degraded image which is degraded by blur; a vector generating unit configured to convert the object area images respectively to frequency areas and extract a feature vector indicating the amount of blur; a storage unit configured to group a plurality of blurred images generated by applying a plurality of point spread functions stored in advance individually to a plurality of training images without blur stored in advance into clusters, and store the respective clusters therein in one-to-one correspondence with the respective point spread functions; an estimating unit configured to compare the feature vector and the plurality of burred images belonging to the respective clusters by a pattern recognition method, obtain a cluster which is most similar to the feature vector, and select one of the point spread functions which corresponds to the most similar cluster; a restoring unit configured to restore the object area image into an image before blurred using the selected point spread function; and an identifying unit configured to compare the restored image and the target image to recognize the object.

According to the embodiments of the invention, estimation of noise-resistant point spread functions is achieved.

DETAILED DESCRIPTION OF THE INVENTION

Figure 1:
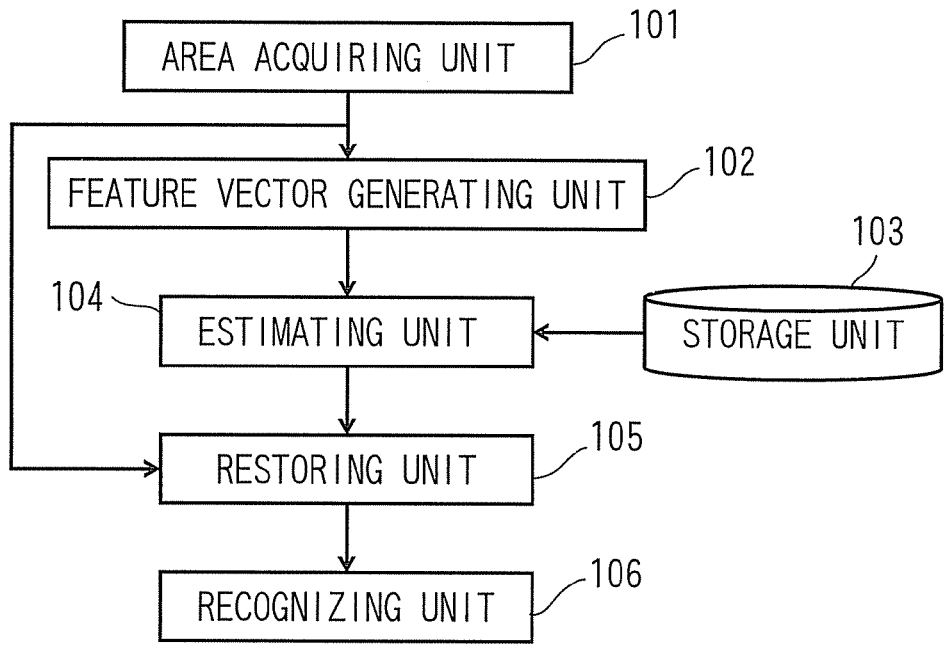
FIG. 1 is a configuration drawing showing an object recognizing apparatus according to an embodiment of the invention.

Referring now to the drawings, an embodiment of the invention will be described.

Before describing the embodiment in detail, a concept of the embodiment will be described.

This embodiment assumes that the appearances of images of a face blurred by a certain point spread function (hereinafter, referred to as PSF) are similar among different persons.

This embodiment assumes that the appearance of images of a face blurred by different PSFs are not similar even they are the images of the same person. Therefore, the states of the image generated by various PSFs may be clustered on the PSF-to-PSF basis.

In this embodiment, the set of these clusters is referred to as "variations in appearance" due to blur (e.g., motion blur or out of focus), which is used for PSF estimation. In this embodiment, when the image is degraded, a PSF is selectively estimated by comparing with the variations in image due to blur, and the individual is identified using the image restored by the PSF. Variations in image due to blur are learned in advance from persons other than those used for individual identification by establishing two assumptions.

The first assumption is performed as follows.

The assumption of the range in which the PSF can be varied is achieved according to an environment of usage of the face recognition.

The second assumption is performed as follows.

Degradation of the appearance of the face due to blur is assumed to have the same tendency irrespective of the person.

The process of degradation of an image due to blur is defined by Expression 1.

$$g = Hf + n \quad (1)$$

where g is a vector of pixel value indicating a degraded image g(u, v) or a vector of pixel value of each of RGB, u, v is a position of a pixel on the image, H is a matrix indicating the PSF, f is a pixel value indicating an original image or a vector of pixel value of each of RGB, and n is a vector indicating a noise. The vectors g, f are assumed to be generated from only a face area.

Figure 4A:
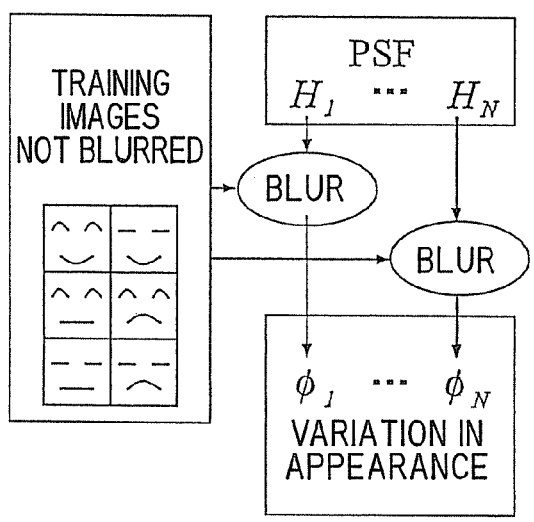
FIGS. 4A and 4B are conceptual drawings showing the embodiment.
Figure 4B:
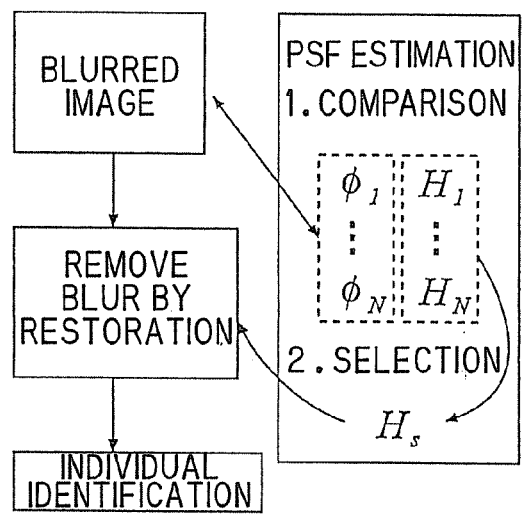

FIGS. 4A and 4B are conceptual drawings showing the embodiment. The embodiment includes a learning process for learning variations in appearance due to blur shown in FIG. 4A and a recognizing process performed when a degraded image is given in FIG. 4B.

First of all, the learning process shown in FIG. 4A will be described.

In the embodiment, the PSFs which vary continuously in a certain range are sampled in the environment of usage of the facial recognition, and N PSFs are prepared as in Expression 2.

$$\Omega = \{H_i | i = 1, \ldots, N\} \quad (2)$$

Accordingly, in the embodiment, the problem of PSF estimation including a large amount of unknown variables is replaced to a problem of selecting an adequate PSF from N PSFs. In the embodiment, when selecting the PSFs, variations in appearance φ of the image due to burr in Expression 3 are used.

$$\Phi = \{\phi_i | i = 1, \ldots, N\} \quad (3)$$

where $\phi_i$ is a statistical model generated from a cluster in which the appearance blurred by PSF $H_i \in \Omega$ belongs. The appearances of the face having the same PSF belong to the same cluster. The respective clusters learn these images from M pieces of training images ψ which are not burred in Expression 4 in advance.

$$\Psi = \{t_k | k = 1, \ldots, M\} \quad (4)$$

Training images are obtained by shooting persons different from the target image used for individual identification.

Subsequently, the recognizing process shown in FIG. 4B will be described.

In the embodiment, when a vector g having an unknown PSF is given, the vector g is compared with φ∈Φ to select the cluster where the appearance of the vector g belongs.

In order to select, in the embodiment, the cluster to which the appearance of the vector g is similar is determined by a pattern recognition method. The PSF corresponding to the selected cluster is $H_s$ of the vector g.

In the restoring process, the image before being blurred is restored from g using the selected $H_s$.

In the identifying process, the feature for identifying the individual from the restored image is calculated, and is compared with the target images of the respective persons to identify the individual.

Figure 2:
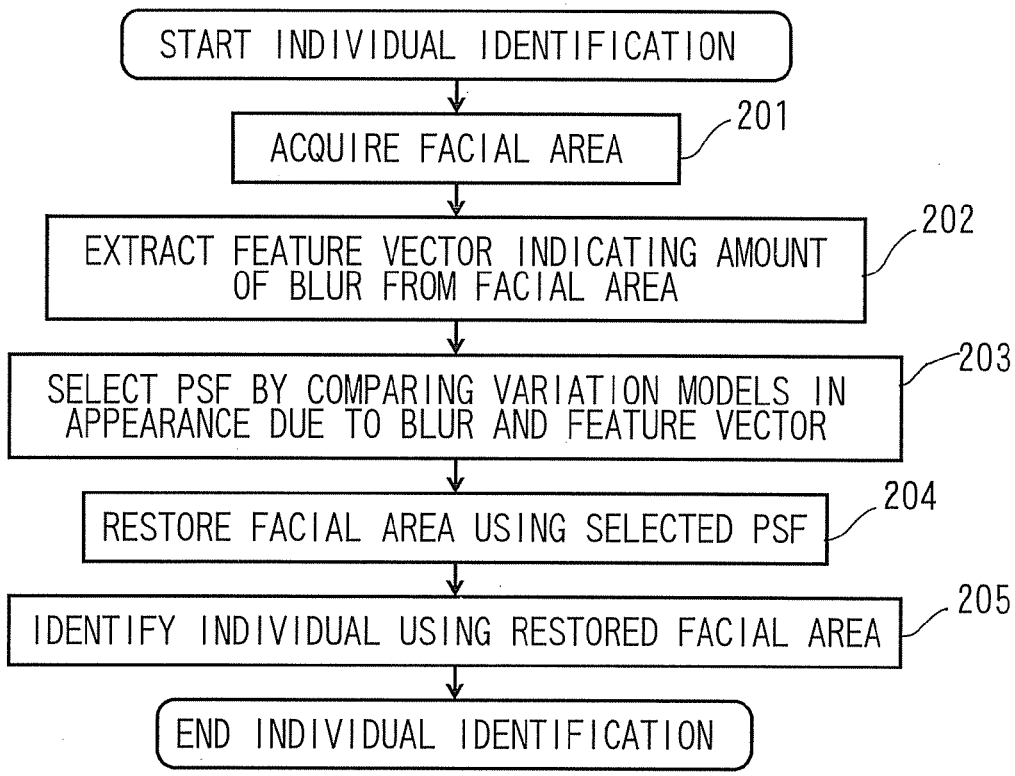
FIG. 2 is a chart showing a flow of facial recognition.
Figure 3A:
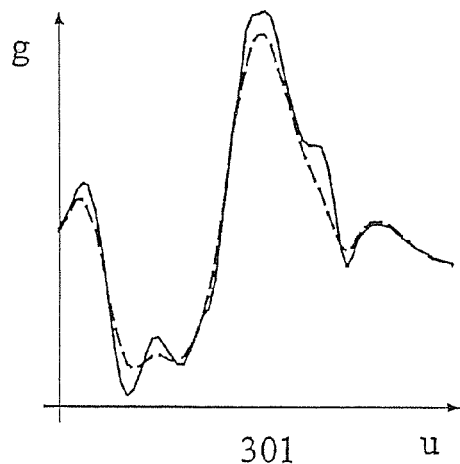
FIGS. 3A to 3D are comparative drawings of feature vectors.
Figure 3B:
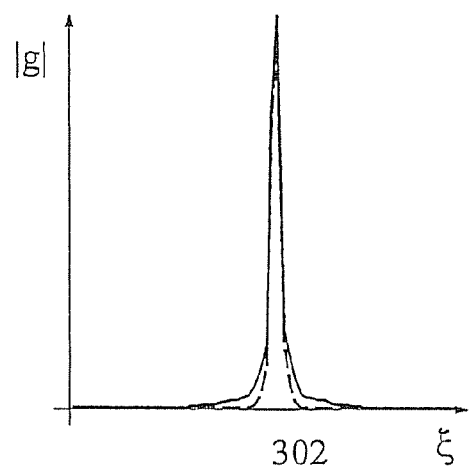
Figure 3C:
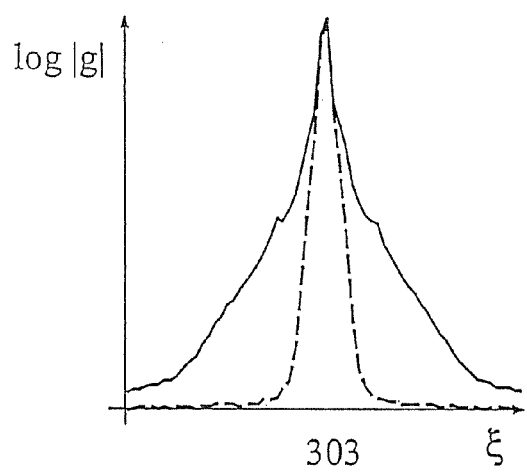
Figure 3D:
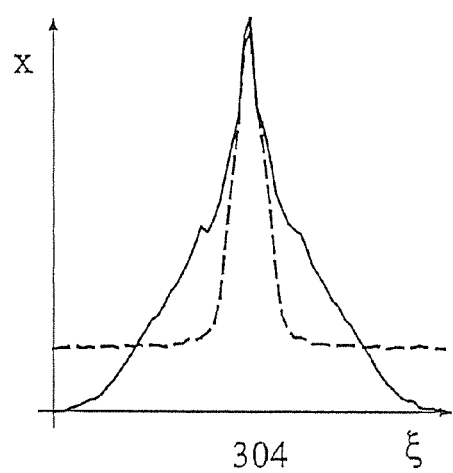

Referring now to FIG. 1 to FIG. 3, the object recognizing apparatus 100 for performing facial recognition according to the embodiment will be described. In the embodiment, the individual identification is performed using the PSF estimation on the basis of variation in appearance. FIG. 1 shows a configuration of the object recognizing apparatus 100.

The object recognizing apparatus 100 includes an area acquiring unit 101, a feature vector generating unit 102, a storage unit 103, an estimating unit 104, a restoring unit 105, and an identifying unit 106.

The area acquiring unit 101 detects a face area from an image outputted from a camera and acquires an image g (u, v) including only the face area (Step 201 in FIG. 2).

Therefore, the area acquiring unit 101 detects, for example, a feature point in the face and applies the same to a 3D shape model, so that the orientation and the size of the face are corrected.

The feature vector generating unit 102 generates a feature vector x indicating the amount of blur from g (u, v) (Step 202 in FIG. 2).

The feature vector generating unit 102 converts g (u, v) into a feature image x (ξ', η') by Expression 5.

$$x(\xi', \eta') = \text{downsampling}(\log|g(\xi, \eta)|) \quad (5)$$

where g (ξ, η) represents two-dimensional Fourier transform of g(u, v), ‖ represents the amplitude.

The amplitude value obtained by the Fourier transform represents the strengths of respective frequency components and is considered to be an adequate feature which represents the amount of blur.

Since the amplitude value of a direct current component in the strength of the respective frequency components is very large in comparison with the high-frequency component, a logarithmic transform is applied. The down sampling is used for reducing the amount of calculation in a post process.

The feature vector generating unit 102 is also able to obtain the phase by the Fourier transform. The phase is affected significantly by the individuality, and hence is effective for the individual identification. However, it is an unnecessary feature for the PSF estimation.

The feature vector generating unit 102 transforms the transformed feature image x (ξ', η') to a feature vector x by raster scanning. Since a subspace method used in the PSF estimation is a method of measuring the angle formed between the vector and the subspace, a norm is normalized. For example, the feature vector generating unit 102 uses L2 norm to achieve $\|x\|_2 = 1$.

FIG. 3 shows examples of waveforms of feature s in the blurred state and in the state not blurred. A waveform 301 in FIG. 3A is a degraded image. A waveform 302 in FIG. 3B is a cross-sectional view of an image after having applied the Fourier transform. A waveform 303 in FIG. 3C is a cross-sectional view of an image after having applied the logarithmic transform. A waveform 304 in FIG. 3D is a cross-sectional view of an image after having applied the norm normalization. Solid lines in FIGS. 3A to 3D indicate the states not blurred, broken lines indicate the blurred states. In the case of the waveform 301, the waveforms are almost the same. In contrast, in the case of the waveform 304, the difference in amount of blur is clearly visible.

The statistical models Φ Expression 3 used for the PSF estimation is stored in the storage unit 103. The value $\phi_i \in \Phi$ is defined by Expression 6.

$$\Phi_i = \{b_{ij}|j=1,\ldots,D\} \quad (6)$$

where $b_{ij}$ represents a basis vector, and D represents the number of dimensions of the subspace.

A method of obtaining the basis vector of the subspace will be described below.

In this method, the blur is added artificially using the training image ψ which is sharp and Hi∈Ω according to Expression 7.

$$h_{ik} = H_i t_k + n_t \quad (7)$$

where, $n_t$ is a vector which indicates a noise to be given to the training image. The vector $n_t$ is measured in advance from a camera system.

Then, in this method, transform to $h_{ik}$ is performed. In this method, it is also applicable to subtract an average feature vector obtained from all the training patterns $\{t_k|k=1,\ldots,M\}$ from $y_{ik}$ in order to improve the estimation performance.

Subsequently, in this method, an eigenvalue and an eigenvector of an autocorrelation matrix in Expression 8 are obtained, and D pieces of eigenvectors $b_{ij}$ are selected in descending order from the one having the largest eigenvalue.

$$A_i = \frac{1}{M}\sum_{k=1}^{M} y_{ik} y_{ik}^T \quad (8)$$

In the estimating unit 104, the vector x outputted from the feature vector generating unit 102 and the models Φ of the storage unit 103 are compared using the subspace method to estimate the PSF (Step 203 in FIG. 2).

The subspace method is capable of multi-classes recognition, and a stable identification performance is obtained. The estimating unit 104 selects a label s in Expression 9 when an unknown x is given to the PSF.

$$s = \arg\max_i \{\cos^2 \theta_i | i=1,\ldots,N\} \quad (9)$$
$$= \arg\max_i \left\{ \sum_{j=1}^{D} (b_{ij}^T x)^2 \middle| i=1,\ldots,N \right\}$$

where x represents a feature vector representing the amount of blur of g and $\theta_i$ is an angle formed between the subspace and the feature vector. The psf $H_s$ corresponding to the label s corresponds the PSF estimated from x.

In the restoring unit 105, the image is restored for the vector g outputted from the area acquiring unit 101 using the PSF $H_s$ outputted from the estimating unit 104 (Step 204 in FIG. 2).

Although the restoring unit 105 may simply apply an inverse matrix of the PSF $H_s$, the presence of the noise in Expression 1 cannot be ignored.

Therefore, the restoring unit 105 restores the image using, for example, Wiener filter or BTV normalization. BTV is Bilateral Total Variation, and this BTV normalization is described in S. Farsiu, M. D. Robinson, M. Elad, P. Milanfar, Fast and robust multiframe super resolution, IEEE Trans. Image Processing, Vol. 13, NO. 10, pp. 1327-1344, 2004.

In these methods, handling of the noise is different. The BTV normalization has a higher noise-resistance, but needs more computational cost than the Wiener filter. In this embodiment, it is recommended to selectively use according to the noise in the degraded image.

For example, the restored image a restored by the Wiener filter is obtained by Expression 10.

$$a = (H_s^T H_s + R_f^{-1} R_n)^{-1} H_s^T g \quad (10)$$

where $R_f$ represents an autocorrelation matrix of an original image and $R_n$ represents an autocorrelation matrix of the noise.

The restoring unit 105 estimates the autocorrelation matrix of the original image from the training image A.

The restoring unit 105 estimates the autocorrelation matrix of the noise from the camera system in advance.

In the description given above, the vector g, which is outputted from the area acquiring unit 101 and obtained by correcting the orientation and size in the 3D shape model is used.

However, the restoring unit 105 may perform the same process on the image outputted from the camera instead of g. In such a case, the PSF estimated by the estimating unit 104 sill has instability in size. In order to eliminate the instability, the restoring unit 105 is able to use a positional relation of the feature points in the face.

In the identifying unit 106, the individual is identified using the restored image vector a outputted from the restoring unit 105 (Step 205 in FIG. 2).

For example, the identifying unit 106 determines the person by comparing the distance between the restored image vector a and the target image using a nearest neighbor rule. The identifying unit 106 is able to identify the individual using other general pattern recognition methods.

According to the embodiment, when a blurred image is given, the PSF is estimated by the comparison with the variation models in appearance of the face due to blur. The image restored by the PSF is used for identifying the individual. In the embodiment, since the appearance of the entire face is used instead of the edge on the contour, the PSF is stably estimated. The variation models in appearance of the face due to blur are learned from other persons different from the target images used for identifying the individual.

In the embodiment, the estimation of the PSF having a noise resistance is achieved by learning the model including the noise. According to the embodiment, lowering of the FAR and FRR for individual identification is achieved by restraining the influence of blur.

The invention is not limited to the embodiment shown above, and may be modified variously without departing from the scope of the invention.

For example, in the embodiment shown above, the subspace method is used for estimating the PSF. However, other pattern recognition methods such as the nearest neighbor rule are also applicable in the embodiment.

A case where the embodiment employs the nearest neighbor rule will be described. The object recognizing apparatus blurs the training images with the respective PSFs, and generates a set of the blurred images. When the image having an unknown PSF is given, the object recognizing apparatus calculates similarities to all the images included in the set of the blurred images.

Although the individual recognition by the face has been described in the embodiment shown above, the embodiment is not limited to the face and may be applied to the recognition of other objects, such as motor vehicles.

What is claimed is:

1. An object recognizing apparatus comprising:
an area acquiring unit configured to detect object area images of an object to be recognized from a degraded image which is degraded by blur;
a feature vector generating unit configured to generate a feature vector by converting the object area images respectively to frequency areas and extracting a feature vector indicating the amount of blur;
a storage unit configured to generate a plurality of blurred images by applying a plurality of point spread functions stored in advance individually to a plurality of training images without blur stored in advance, group the plurality of blurred images generated by the plurality of point spread functions into clusters, and store the respective clusters therein in one-to-one correspondence with the respective point spread functions;
an estimating unit configured to compare the feature vector and the plurality of burred images belonging to the respective clusters by a pattern recognition, obtain a cluster which is most similar to the feature vector, and select one of the point spread functions which corresponds to the most similar cluster;
a restoring unit configured to restore the object area image into the image before blurred using the selected point spread function; and
an identifying unit configured to compare the restored image and the target image to identify the object.

2. The apparatus according to claim 1, wherein the feature vector generating unit calculates the feature vector by obtaining an amplitude value of the object area image by Fourier transform, applying a logarithmic transform to the amplitude value, and then performing down sampling and normalization of a norm.

3. The apparatus according to claim 1, wherein the storage unit stores subspaces formed from the plurality of blurred images belonging to the respective clusters on the cluster-to-cluster basis, and the estimating unit compares the subspaces for the respective clusters and the feature vector by a subspace method.

4. The apparatus according to claim 1, wherein the area acquiring unit acquires the object area images by detecting a feature point of the object area images from the degraded image and applying the feature point to an average object area shape.

5. An object recognizing method comprising:
acquiring an area by detecting object area images of an object to be recognized from a degraded image which is degraded by blur;
generating a feature vector by converting the object area images respectively to frequency areas and extracting a feature vector indicating the amount of blur;
storing clusters by generating a plurality of blurred images by applying a plurality of point spread functions stored in advance individually to a plurality of training images without blur stored in advance, grouping the plurality of blurred images generated by the plurality of point spread functions into clusters, and storing the respective clusters in one-to-one correspondence with the respective point spread functions;
estimating one of the point spread functions by comparing the feature vector and the plurality of burred images belonging to the respective clusters by a pattern recognition method, obtaining a cluster which is most similar to the feature vector, and selecting one of the point spread functions which corresponds to the most similar cluster;
restoring the object area image into the image before blurred using the selected point spread function; and
identifying the object by comparing the restored image and the target image to recognize the object.

6. The method according to claim 5, wherein the generating includes calculating the feature vector by obtaining an amplitude value of the object area image by Fourier transform, applying a logarithmic transform to the amplitude value, and then performing down sampling and normalization of a norm.

7. The method according to claim 5, wherein the storing includes storing subspaces formed from the plurality of blurred images belonging to the respective clusters on the cluster-to-cluster basis, and comparing the subspaces for the respective clusters and the feature vector by the subspace method.

8. The method according to claim 5, wherein the acquiring includes acquiring the object area images by detecting a feature point of the object area images from the degraded image and applying the feature point to an average object area shape.

* * * * *